United States Patent
Chiproot

(10) Patent No.: US 9,212,768 B2
(45) Date of Patent: Dec. 15, 2015

(54) COUPLING WITH UNIFORM CIRCUMFERENTIAL TIGHTENING

(71) Applicant: Avi Chiproot, Kfar-Saba (IL)

(72) Inventor: Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 17 days.

(21) Appl. No.: 14/173,065

(22) Filed: Feb. 5, 2014

(65) Prior Publication Data

US 2015/0219256 A1   Aug. 6, 2015

(51) Int. Cl.
| | |
|---|---|
| *F16L 17/00* | (2006.01) |
| *F16L 21/06* | (2006.01) |
| *F16L 21/02* | (2006.01) |
| *F16L 21/03* | (2006.01) |
| *F16L 25/14* | (2006.01) |

(52) U.S. Cl.
CPC .............. *F16L 21/065* (2013.01); *F16L 21/022* (2013.01); *F16L 21/03* (2013.01); *F16L 25/14* (2013.01)

(58) Field of Classification Search
USPC ............ 285/337, 95, 104, 369, 110, 111, 421
See application file for complete search history.

(56) References Cited

U.S. PATENT DOCUMENTS

| | | | | |
|---|---|---|---|---|
| 3,485,515 | A  * | 12/1969 | Frishof .............................. | 285/5 |
| 5,941,576 | A  * | 8/1999 | Krausz ........................... | 285/110 |
| 6,106,029 | A  * | 8/2000 | DeMore et al. ................ | 285/322 |
| 6,773,040 | B2 * | 8/2004 | Saito et al. ..................... | 285/337 |
| 2012/0025524 | A1* | 2/2012 | Krausz et al. .................. | 285/421 |
| 2012/0145270 | A1* | 6/2012 | Krausz et al. .................. | 138/97 |
| 2013/0154259 | A1* | 6/2013 | Chiproot ....................... | 285/337 |

FOREIGN PATENT DOCUMENTS

| | | |
|---|---|---|
| DE | 29517624 | 12/1995 |
| EP | 0916887 | 5/1999 |
| FR | 2088824 | 1/1972 |
| GB | 2349189 | 10/2000 |
| WO | 9641983 | 12/1996 |

OTHER PUBLICATIONS

European Search Report EP15152497.2, Jun. 25, 2015.

* cited by examiner

*Primary Examiner* — Aaron Dunwoody
(74) *Attorney, Agent, or Firm* — Dekel Patent Ltd.; David Klein

(57) ABSTRACT

A pipe coupling includes an annular clamp housing that has ends which are provided with two opposing clamp members. One or more tightening elements are provided for tightening the clamp members towards each other in a direction transverse to an axial length of the annular clamp housing so as to apply a radially-inward clamping force on a pipe being clamped in the annular clamp housing. An annular seal is mounted in the annular clamp housing. The annular clamp housing includes one or more enhanced circumferential stiffening elements.

8 Claims, 6 Drawing Sheets

COUPLING WITH UNIFORM CIRCUMFERENTIAL TIGHTENING

FIELD OF THE INVENTION

The present invention relates generally to couplings (or clamps) and grip rings for pipes, and particularly to a coupling with uniform circumferential tightening.

BACKGROUND OF THE INVENTION

Many kinds of removable couplings have an elastomeric seal assembly which is tightened to form a watertight seal against a pipe. It is noted that throughout the specification and claims, the term "pipe" encompasses any kind of generally cylindrical object. The coupling is generally a partial ring with clamping lugs or ears, which are drawn towards each other by means of one or bolts that are mounted on the ears or lugs. Tightening the bolt reduces the overall diameter of the coupling and thus causes the coupling to be tightened around the pipe and achieve the desired watertight seal. The lugs are generally at the top of the coupling—the 12 o'clock position.

It is important to form a uniformly tight seal around the entire circumference of the pipe. However, because such couplings are generally made of strong materials, such as steel, the area of the ears or lugs (which is less stiff than the rest of the coupling) is tightened more than the rest of the coupling, particularly 180° from the lugs (the 6 o'clock position). Even worse, the area of the ears or lugs can dig into the pipe due to the uneven tightening of the coupling. This can mar the pipe and also interfere with further tightening of the coupling.

SUMMARY OF THE INVENTION

The present invention seeks to provide an improved coupling, which solves the abovementioned problem of the prior art, as is described more in detail hereinbelow. Unlike the prior art, the coupling of the present invention has enhanced circumferential stiffening elements, which achieve uniform circumferential tightening.

In the prior art, the fastener which tightens the coupling is effective over a limited arc length of the coupling, such as about the arc that subtends the 11 o'clock position to the one o'clock position. In the invention, the enhanced circumferential stiffening elements increase the tightening effectiveness by pulling over a substantially greater arc length of the coupling, such as about the arc that subtends the 8 or 9 o'clock position to the 3 or 4 o'clock position (i.e., an arc that subtends at least 180°).

There is thus provided in accordance with an embodiment of the present invention a pipe coupling including an annular clamp housing that has ends which are provided with two opposing clamp members and that includes one or more tightening elements for tightening the clamp members towards each other in a direction transverse to an axial length of the annular clamp housing so as to apply a radially-inward clamping force on a pipe being clamped in the annular clamp housing, and an annular seal mounted in the annular clamp housing, wherein the annular clamp housing includes one or more enhanced circumferential stiffening elements.

In accordance with an embodiment of the present invention the one or more enhanced circumferential stiffening elements are structured so as to create a circumferentially uniform tightening of the coupling when the one or more tightening elements are tightened.

In accordance with an embodiment of the present invention the one or more enhanced circumferential stiffening elements includes one or more circumferential walls which from structure of the annular clamp housing, the one or more walls having a non-uniform width.

In accordance with an embodiment of the present invention a pair of the circumferential walls are separated from one another by a circumferential channel.

In accordance with an embodiment of the present invention the one or more walls are widest near a top of the coupling and narrowest at a bottom of the coupling and the width of the one or more walls changes uniformly from the top to the bottom.

In accordance with an embodiment of the present invention the one or more enhanced circumferential stiffening elements includes an annular stiffening rib with a non-uniform width.

In accordance with an embodiment of the present invention the width of the annular stiffening rib is widest near a top of the coupling and tapers to a small or zero width as the rib extends circumferentially downwards.

BRIEF DESCRIPTION OF THE DRAWINGS

The present invention will be understood and appreciated more fully from the following detailed description, taken in conjunction with the drawing in which.

DETAILED DESCRIPTION OF EMBODIMENTS

Figure 1:
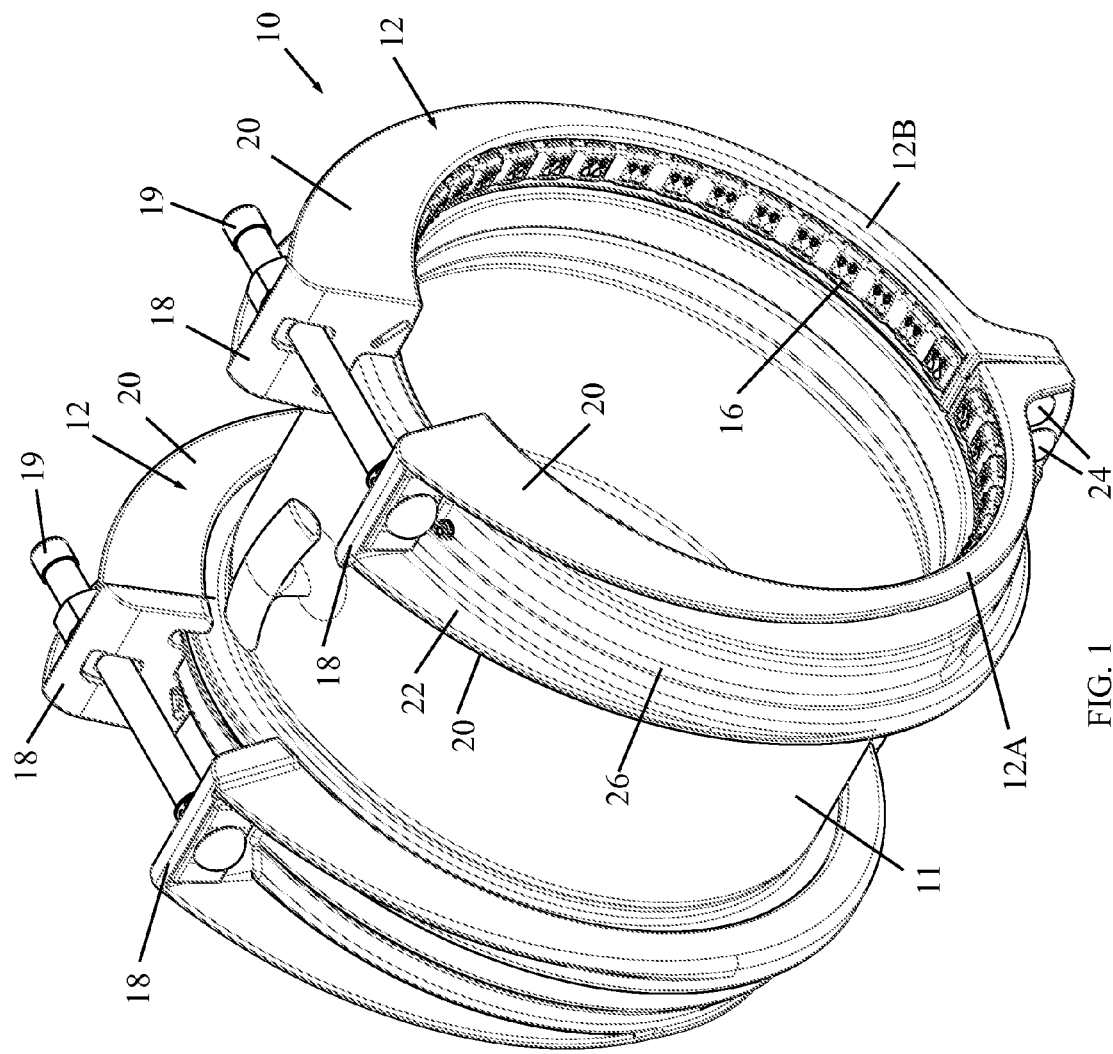
FIGS. 1 and 2 are simplified perspective and end-view illustrations, respectively, of a pipe coupling, constructed and operative in accordance with a non-limiting embodiment of the present invention.
Figure 2:
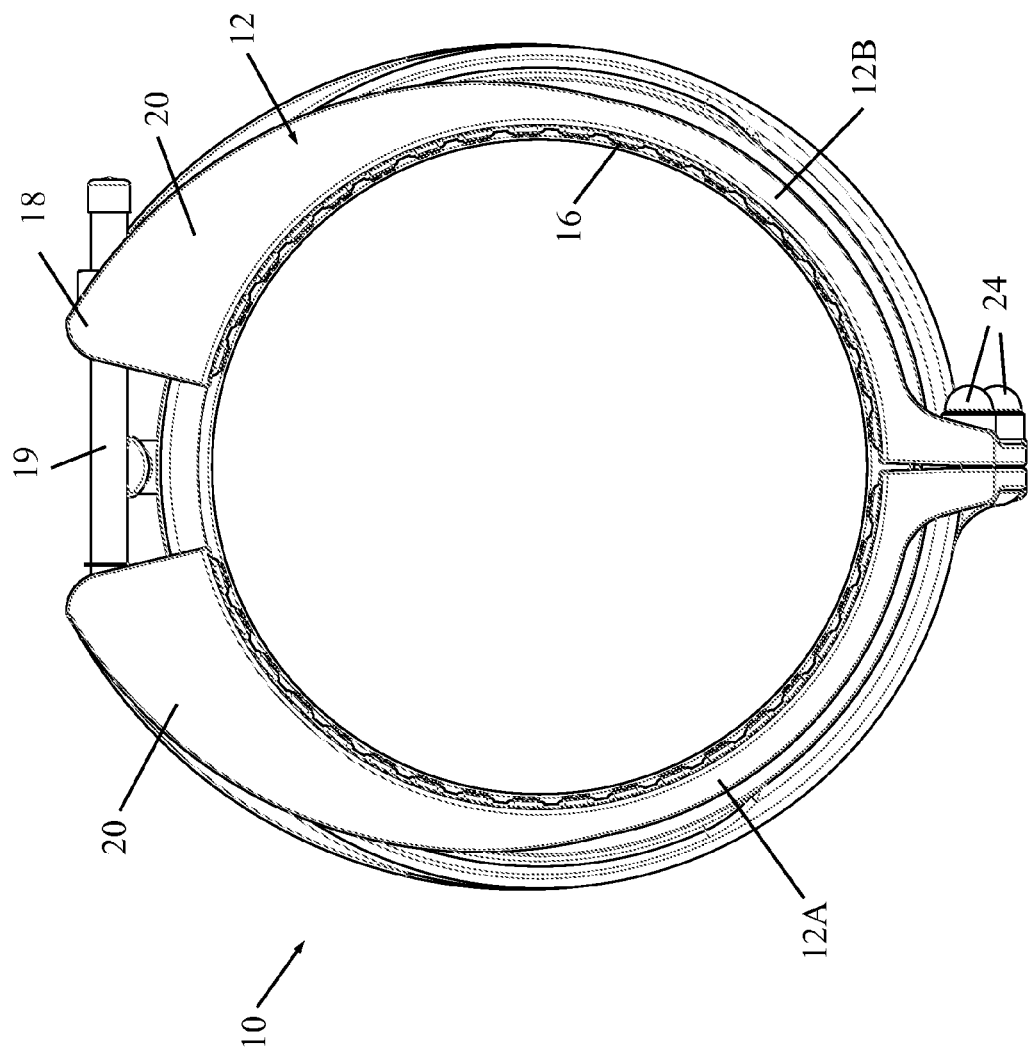

Reference is now made to FIGS. 1 and 2, which illustrate a pipe coupling 10, constructed and operative in accordance with a non-limiting embodiment of the present invention.

Figure 6:
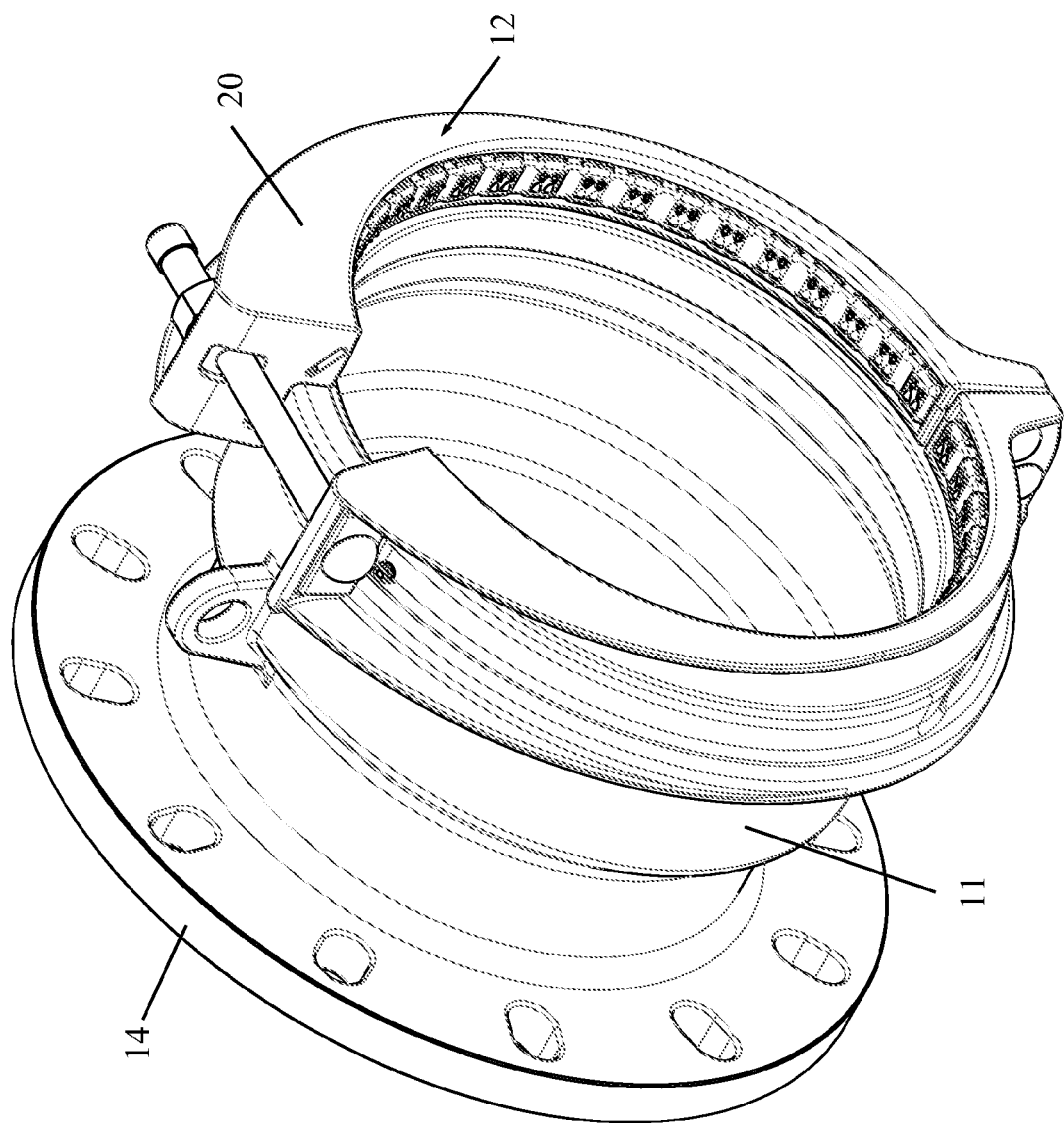
FIG. 6 is a simplified perspective illustration of a pipe coupling and flange assembly, in accordance with an embodiment of the present invention.

Pipe coupling 10 includes a cylindrical body 11 with one or more annular clamp housings 12, typically made of a flexible metal, such as but not limited to, stainless steel. The illustrated embodiment in FIG. 1 has a pair of annular clamp housings 12 at opposite ends of body 11. The illustrated embodiment in FIG. 6 has one annular clamp housing 12 at one end of body 11 and a flange 14 at the other end of body 11. Annular clamp housing 12 is adapted for sealing against pipes of different diameters (not shown). (For example, the pair of annular clamp housings 12 can be used to clamp against pipes of the same or different diameters.)

Annular clamp housing 12 is provided with an annular seal 16 that, without limitation, may be made of a rubber (e.g., EPDM (ethylene propylene diene monomer), butyl, styrene butadiene or neoprene) or a thermoplastic elastomer (e.g., polyurethane or olefin) compatible with the fluid to be carried in the pipe. For example, without limitation, seal 16 may be made of EPDM rubber with 70-80 Shore A durometer.

The ends of annular clamp housing 12 are provided with two opposing clamp members 18. One or more tightening elements 19 (e.g., one or more mechanical fasteners, such as a bolt or screw and a tightening nut, and possibly washer) fasten and tighten clamp members 18 towards each other in a direction transverse to the axial length of annular clamp housing 12 so as to apply a radially-inward clamping force on seal 16 and on the pipe being clamped, thereby effecting a watertight seal on the pipe.

In accordance with an embodiment of the present invention, annular clamp housing 12 includes one or more enhanced circumferential stiffening elements. One kind of enhanced circumferential stiffening element is one or more circumferential walls 20, which from the structure of the housing 12 (the illustrated embodiment has two such walls 20 separated by a circumferential channel 22. The walls 20 have a non-uniform width (width being measured in the radial direction of the coupling transverse to the longitudinal axis of the coupling). For example, the walls are widest near the top of the coupling and narrowest at the bottom of the coupling and the width changes uniformly from the top to the bottom. By relatively stiffening the top of the housing and relatively weakening the bottom of the housing, the annular clamp housing 12 has uniform stiffness around its entire circumference and solves the problem of the prior art.

Figure 3:
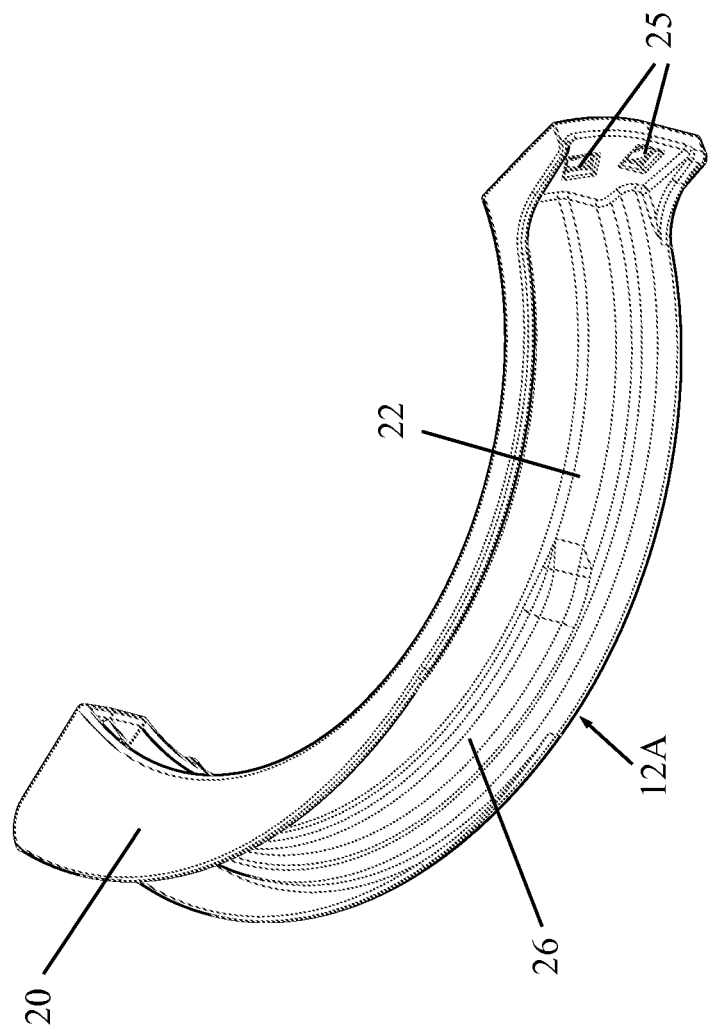
FIGS. 3, 4 and 5 are simplified perspective illustrations of a coupling member with enhanced circumferential stiffening elements, in accordance with an embodiment of the present invention.

In the illustrated embodiment in FIG. 1, each annular clamp housing 12 includes a pair of coupling members 12A and 12B which are fastened together at the bottom of the coupling with one or more fasteners 24 that pass through apertures 25 (FIG. 3). Alternatively, annular clamp housing 12 may be of a one-piece construction.

Figure 4:
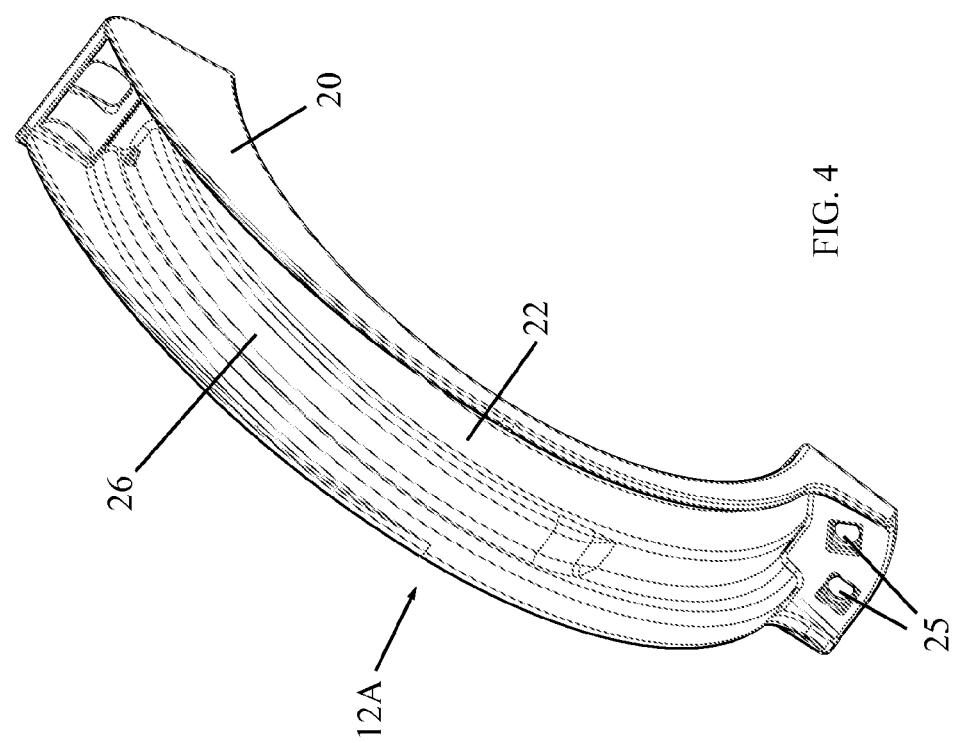
Figure 5:
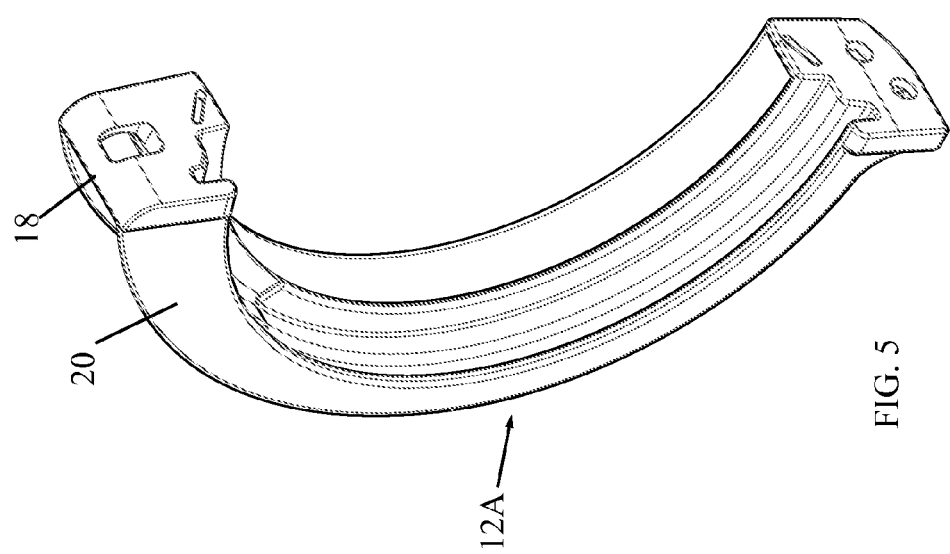

FIGS. 3-5 illustrate coupling member 12A (12B being the mirror image). In accordance with another embodiment of the present invention, annular clamp housing 12 also includes an enhanced circumferential stiffening element 26. For example, coupling members 12A or 12B may include an annular stiffening rib 26 located in channel 22 which extends generally from the 12 o'clock position to the 3 or 4 o'clock position. The width of the annular stiffening rib 26 may be non-uniform, being widest near the top and tapering to a small or zero width as the rib extends circumferentially downwards.

What is claimed is:

1. A pipe coupling comprising:
   an annular clamp housing that has ends which are provided with two opposing clamp members and that comprises one or more tightening elements for tightening said clamp members towards each other in a direction transverse to an axial length of said annular clamp housing so as to apply a radially-inward clamping force on a pipe being clamped in said annular clamp housing; and
   an annular seal mounted in said annular clamp housing;
   wherein said annular clamp housing comprises one or more enhanced circumferential stiffening elements, and wherein said one or more enhanced circumferential stiffening elements comprises a pair of circumferential walls which form structure of said annular and an annular stiffening rib located in said channel.

2. The pipe coupling according to claim 1, wherein said one or more enhanced circumferential stiffening elements are structured so as to create a circumferentially uniform tightening of said coupling when said one or more tightening elements are tightened.

3. The pipe coupling according to claim 1, wherein said circumferential walls having a non-uniform width.

4. The pipe coupling according to claim 3, wherein said walls are widest near a top of said coupling and narrowest at a bottom of said coupling and the width of said walls changes uniformly from the top to the bottom.

5. The pipe coupling according to claim 1, wherein the width of said annular stiffening rib is widest near a top of the coupling and tapers to a small or zero width as said rib extends circumferentially downwards.

6. The pipe coupling according to claim 1,
   wherein said one or more enhanced circumferential stiffening elements pull over an arc that subtends at least 180°.

7. The pipe coupling according to claim 1, wherein said annular stiffening rib has a non-uniform width.

8. The pipe coupling according to claim 1, wherein said annular stiffening rib extends from a 12 o'clock position near said tightening elements to a 3 or 4 o'clock position.

* * * * *